(12) United States Patent
Chassagne et al.

(10) Patent No.: US 7,211,284 B1
(45) Date of Patent: May 1, 2007

(54) PROCESS FOR COATING CHEESE

(75) Inventors: Marie-Hélène Chassagne, Marcilly (FR); Annie Imbert, Vitry sur Seine (FR); Jean Graille, Montpellier (FR); Michel Pina, Montpellier (FR); Serge Laurent, Montpellier (FR)

(73) Assignee: Fromageries Bel, Paris (FR)

( * ) Notice: Subject to any disclaimer, the term of this patent is extended or adjusted under 35 U.S.C. 154(b) by 594 days.

(21) Appl. No.: 10/031,489

(22) PCT Filed: Jun. 22, 2000

(86) PCT No.: PCT/FR00/01742

§ 371 (c)(1),
(2), (4) Date: May 13, 2002

(87) PCT Pub. No.: WO01/05240

PCT Pub. Date: Jan. 25, 2001

(30) Foreign Application Priority Data

Jul. 21, 1999 (FR) .................................. 99 09462

(51) Int. Cl.
*A23C 19/06* (2006.01)
*A23C 19/09* (2006.01)
(52) U.S. Cl. .................... 426/302; 426/89; 426/582
(58) Field of Classification Search ................ 426/273, 426/293, 307, 582, 135, 125, 89–99, 122, 426/130, 289, 302–305, 310, 297
See application file for complete search history.

(56) References Cited

U.S. PATENT DOCUMENTS

| 4,518,772 | A | * | 5/1985 | Volpenhein | ................. 536/119 |
| 4,585,658 | A | * | 4/1986 | Poppe et al. | ................. 426/303 |
| 4,810,534 | A | * | 3/1989 | Seaborne et al. | ........... 427/384 |
| 4,960,600 | A | * | 10/1990 | Kester et al. | ................ 426/310 |
| 4,968,791 | A | * | 11/1990 | Van Der Plank | ............ 536/119 |
| 5,147,670 | A | * | 9/1992 | Cebula et al. | ................. 426/98 |
| 5,516,536 | A | * | 5/1996 | Mikkelsen et al. | ........... 426/98 |

FOREIGN PATENT DOCUMENTS

| EP | 0 811 664 | 12/1997 |
| JP | 56 056223 | 5/1981 |

OTHER PUBLICATIONS

Handbook of Thermoset plastics (2nd Edition). William Andrew Publishing, 1998, S.H. editor. p. 119. Retrieved from www.knovel.com on Jan. 19, 2005.*

* cited by examiner

Primary Examiner—Arthur L. Corbin
(74) Attorney, Agent, or Firm—Young & Thompson

(57) ABSTRACT

A cheese coating method, in particular pressed paste cheese, is characterised in that it consists in applying on whole cheeses or cheese portions, a coating composition comprising from 60 wt. % to 100 wt. % of an esterifying product of at least a fatty acid and at least a branched polyol having at least 3 carbon atoms and at least two OH groups.

16 Claims, No Drawings

PROCESS FOR COATING CHEESE

The present invention relates to a process for coating cheeses. It also relates to novel coating compositions for cheeses, and also to a process for manufacturing these coatings.

Some cheeses, more particularly pressed cheeses, are preserved in a protective coating, which avoids, firstly, the cheese drying out and, secondly, the cheese being spoiled by molds. Several types of coating are widely used for this purpose or have been described to this effect.

Mention may be made in particular of:

coverings based on synthetic plastic materials of the vinyl acetate polymer type; in this case the coating is relatively permeable to water and to gases; moreover, this coating or covering is generally relatively thin and adheres to the surface of the cheese, and in order for it to be removed, the cheese needs to be derinded.

coating compositions which advantageously use the melting/crystallization properties of their constituents, which are liquid at the temperatures for coating the cheeses, by soaking or spraying (45 to 90° C.), and waxy and solid at room temperature.

These materials should be plastic and pliable in nature, should not easily break and should not adhere to the cheese upon their removal when the cheeses are eaten.

These compositions generally consist of one or more layers, of variable thickness, of hydrocarbon waxes consisting of a mixture of paraffins, of microcrystalline waxes and, optionally, of mineral oils. This type of coating and its method of application are described in FR 1 453 977.

acetylated monoglycerides in the molten state, which have the property of solidifying in the form of polymorphic crystals during cooling to room temperature, giving waxy, non-greasy and relatively flexible products. These properties have made it possible to suggest the use of these products as coatings, in particular for cheeses.

Thus, EP 0 141 299 describes more particularly a coating for cheeses consisting of a first internal layer based on a mixture of acetic acid esters of fatty acid monoglycerides, and of a second external layer consisting of a conventional wax for coating cheese.

EP 0 403 030 describes a coating composition for cheeses, consisting of a mixture of mono- and diglycerides esterified with various acids (acetic, lactic, citric) and of waxes of plant origin.

EP 0 679 337 describes a coating composition for cheeses, consisting of acetylated monoglyceride obtained from long-chain fatty acids (more than 80% by weight of stearic and behenic acid) having a high melting point and a short solidifying time.

Finally, EP 0 811 664 describes a coating composition for cheeses, advantageously comprising fatty acid mono- and diglycerides combined with a resinous substance which is a methyl ester of hydrogenated colophony, a hydrogenated colophony esterified with glycerol, or a mixture thereof.

However, the various compositions set out above have drawbacks when they are used as coatings for cheeses. Thus, the hydrocarbon waxes, despite excellent functional properties, have a negative environmental effect and, although the innocuity of the hydrocarbon categories used has been acknowledged, their use is likely to be limited sooner or later by the regulations of certain countries.

The coatings consisting mainly of fatty acid mono- and diglycerides have, depending on the cases, the following deficiencies:

a mechanical resistance (shock resistance) which is generally poorer than the hydrocarbon waxes;

a brittle nature with a tendency to flake upon their removal when the cheese is eaten, in particular when the coating is opened using a band (tear-strip) when high melting-point products obtained from long-chain fatty acids are used;

a sticky and greasy feel for products obtained from shorter-chain fatty acids.

Although, in general, these coatings have good plastic properties at temperatures close to room temperature, it is noted that these coatings do not behave as well at temperatures clearly above or below room temperature, likely to occur during the cheese distribution cycle. Thus, some products appear to be too brittle at temperatures of about 4° C., whereas others are very sticky in nature with the appearance of "oiling", sticking to the outer packaging, or possible migration of dyes or of glyceric components of the packaging.

Finally, the constituents of these coatings have a chemical structure which is very close to that of the triglycerides of the cheese, which may promote their miscibility and their possible entrainment into the cheese, accompanied by entrainment of liposoluble dye; in addition, these products are sensitive to the action of the lipases present in cheeses, as confirmed by pancreatic lipase-sensitivity tests.

Since these products are likely to be degraded upon contact with the enzymes of the microorganisms of the cheese, flavor defects may appear during aging of the cheeses.

Moreover, studies carried out by the Applicant show that waxes obtained by esterification of fatty acids and of fatty alcohols produce results which are unsuitable for their use as cheese coatings. Specifically, although these compositions have a thermal behavior (curve of solids content as a function of temperature) close to cheese waxes based on hydrocarbons of petroleum origin, the cheese coatings produced from these components are generally brittle whatever the diversity of the fatty chains used, this being even in the presence of diverse additives capable of slowing down the crystallization of these waxes.

The aim of the present invention is to provide coatings whose properties are improved compared to the coatings described in the prior art, in particular a coating having mechanical properties which are satisfactory at room temperature but also at extreme temperatures likely to occur, including accidentally, in the cheese cycle, which is neither brittle nor sticky, the constituents of which do not migrate into the cheese, which is totally innocuous and which can be easily detached when the cheese is eaten.

The subject of the invention is thus a process for coating cheeses, in particular pressed cheeses, wherein a coating composition is applied onto whole cheeses or portions of cheese, which coating composition comprises from 60% to 100% by weight of a product of esterification of at least one fatty acid and at least one polyol containing a branched chain having at least 3 carbon atoms and at least 2 OH groups.

For the purpose of the present invention, the polyol advantageously comprises at least 5 carbon atoms, the hydrocarbon-based backbone advantageously being saturated. Polyols comprising a substituted neopentyl group are particularly preferred.

Preferably, the polyol according to the invention corresponds to the general formula:

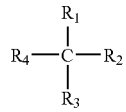

in which $R_1$, $R_2$, $R_3$ and $R_4$, which may be identical or different, are selected from a $C_1$–$C_6$ alkyl group, in particular a methyl or ethyl group, or a $C_1$–$C_6$ hydroxyalkyl group, in particular a hydroxymethyl group; or $R_4$ represents a group

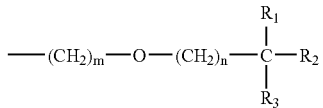

m and n, which may be identical or different, being an integer from 1 to 6, advantageously 1 to 3, preferably equal to 1, $R_1$, $R_2$ and $R_3$ being as defined above, provided that at least two of $R_1$ to $R_4$ are a $C_1$–$C_6$ hydroxyalkyl group.

Among the preferred polyols, mention may be made in particular of pentaerythritol, neopentyl glycol, trimethylolethane, trimethylolpropane and dipenta-erythritol, pentaerythritol being more particularly preferred.

The fatty acids of the present invention correspond to the definition generally accepted for these compounds, namely monocarboxylic acids containing only carbon, hydrogen and oxygen elements and consisting of a hydrocarbyl, preferably alkyl, radical attached to the carboxyl group. Among these, the saturated fatty acids of general formula $CnH_{2n}O_2$ are generally preferred. Methanoic acid and ethanoic acid are the two smallest members of the series, which also comprises palmitic acid and stearic acid. For the purpose of the invention, the fatty acids also encompass the acids of the oleic series, namely of formula $CnH_{2n-2}O_2$, comprising a double bond, among which acrylic acid represents the one having the smallest number of carbon atoms.

Mention may also be made of the linoleic acid series of formula $CnH_{2n-4}O_2$ comprising two double bonds and the linolenic acid series of formula $CH_{2n-6}O_2$ comprising three double bonds.

Natural fatty acids also exist which have four or more double bonds, as do fatty acids comprising hydroxyl groups in the molecule and cyclic fatty acids. All the fatty acids which have just been mentioned are included in the present invention.

Preferably the product of esterification of the fatty acids and of the polyol, representing the main component of the coating, is obtained by esterification of the polyol described above with at least one fatty acid belonging to the two different groups below:

(A) at least one fatty acid of a first group having a high melting range (in the region of 70–80° C.); and (B) at least one fatty acid of a second group having a low melting range (in the region of 24–30° C.), the gap between the melting ranges of groups (A) and (B) being at least 40° C., advantageously at most 60° C.

The fatty acid group (A) also comprises saturated or unsaturated fatty acids comprising more than twelve carbon atoms.

The latter are advantageously selected from hydrogenated palm and rapeseed fatty acids, and preferably from behenic acid-rich rapeseed oil fatty acids.

The fatty acid group (B) advantageously comprises saturated or unsaturated fats having from 1 to 12 carbon atoms; they are advantageously selected from hydrogenated copra fatty acids, octanoic acid, decanoic acid and mixtures thereof.

The fatty acid group (B) also comprises acetic acid and lactic acid.

The amount of fatty acids (B) represents from 0 to 100%, advantageously 0 to 50%, by weight of the total weight of the fatty acids present in the polyol ester, and the amount of fatty acids (A) generally represents from 50 to 100%, preferably 50–75%, by weight relative to the total weight of the fatty acids of the coating composition.

The (B)/(A) molar ratio is preferably selected so that it is between 0.8 and 1.5, advantageously between 1 and 1.3.

The best results are obtained with coatings also comprising a polycarboxylic acid, the latter preferably being present in the form of a product of esterification of the polyol as described above and of the fatty acids (A) and (B) as described above.

The polycarboxylic acid is advantageously a dicarboxylic acid. Advantageously, the dicarboxylic acid comprises from 2 to 16 carbon atoms, preferably from 2 to 12 carbon atoms, and an unsaturated, or preferably saturated, hydrocarbon-based, advantageously polyalkylene, chain optionally substituted with hydroxyl or oxo groups.

Mention may be made in particular of sebacic acid, adipic acid, succinic acid, malic acid and oxalic acid.

The amount of polycarboxylic, advantageously dicarboxylic, acid may range up to 20% of the final composition, it being present in free form or advantageously in a form at least partially, and as much as totally, esterified with the polyol described above.

The presence of the polycarboxylic acid makes it possible in particular to reduce the brittle nature at low temperature of the coatings. Depending on the nature of the polycarboxylic, in particular dicarboxylic, acid used, the degree of incorporation of this acid into the polyol ester ranges between 3 and 20%, and preferably between 3 and 10%, relative to the total initial weight of the polycarboxylic acid present in the reaction mixture.

The most advantageous properties are obtained when the carboxylic acid is a dicarboxylic acid comprising a low number of carbon atom (e.g. a $C_3$–$C_{16}$ dicarboxylic acid), preferably less than 6. Oxalic acid and malic acid are among the acids preferred. The inventors think, without being bound by this theory, that introducing the dicarboxylic acids increases the flexibility of the molecules of the esterification product, either by condensation of the esters on themselves, by virtue of the presence of an additional reactive function borne by the dicarboxylic or polycarboxylic acid, or simply by esterification of an alcohol function of the polyol, with a short-chain dicarboxylic acid.

The amount of polycarboxylic acid added to the starting reaction mixture is adjusted as a function of the molar ratio of fatty acid selected in the range described above.

Coatings which have the most notable characteristics are obtained for an alcohol function/acid function ratio of greater than 1, preferably between 1.0 and 2.0, the acid functions being those of the fatty acids and, where appropriate, of the polyacid.

It is also possible, in order to improve the properties of the coatings of the invention, to add to these coatings an amount ranging up to 20%, advantageously between 5 and 15%, of a plasticizer. Generally, these plasticizers are polymer materials. Mention may be made in particular of copolymers of butyl acrylate or butyl methacrylate and of ethylene, copolymers of vinyl acetate and of ethylene acetate, or other polymer substances miscible with the basic substances and capable of having an influence either on the rheological properties of the coating composition during the coating process, or on the properties of the final coatings themselves.

The coating composition according to the invention may also comprise dyes.

A subject of the invention is also a coating composition for cheeses, wherein it comprises from 60 to 100% by weight of the product of esterification of a polyol containing, a branched chain having at least 3 carbon atoms and at least 2 OH groups and
  of at least one fatty acid (A), and
  of at least one fatty acid (B), the fatty acids (A) having a melting range which is at least 40° C. higher than that of the fatty acids (B).

This coating composition advantageously has the characteristics described above in relation to the coating process.

The subject of the invention is also a process for preparing a coating composition as defined above, wherein an esterification reaction is carried out between at least one polyol as defined above with at least one fatty acid of a first group (A) and at least one fatty acid of a second group (B) as defined above and, optionally, at least one polycarboxylic, in particular dicarboxylic, acid as defined above, advantageously present in a B/A molar ratio between 0.8 and 1.5, advantageously between 1 and 1.3, and, optionally, a plasticizer compatible with foodstuffs, in particular a copolymer of butyl acrylate or butyl methacrylate and of ethylene, or a copolymer of vinyl acetate and of ethylene acetate, is added to the esterification product obtained.

The esterification reaction is generally carried out at high temperature, preferably between 160 and 250° C., more advantageously between 200 and 230° C., in the absence of catalyst. The absence of catalyst makes it possible to simplify the steps of the process and, in particular, to avoid decoloration and the necessity of an additional step for eliminating the catalyst. The plasticizer is preferably added after the esterification reaction, during the cooling of the reaction mixture to lower temperature, preferably to around 150° C. A deodorizing step is generally carried out after the esterification reaction and, optionally, after addition of the plasticizer; it advantageously consists of neutralizing distillation at a temperature of between 200 and 300° C. under vacuum.

The composition of the reaction mixture will advantageously be selected within the ranges indicated above, depending on the properties being sought for the final coating.

The crystallization temperature is an important property for the coating of cheeses, in particular in order to allow rapid solidifying thereof after application of the coating composition on the whole cheese or the portions of cheese. It is not desirable to have too high a crystallization temperature, the latter possibly inducing damage to the product at the time of coating and also possibly producing brittle final coatings.

The inventors have also demonstrated the fact that the polyol esters according to the invention are not sensitive to the action of pancreatic lipase, unlike the glycerol-derived products of the prior art.

The following examples are intended to illustrate the invention.

EXAMPLE 1

Preparation of a Coating Composition According to the Invention 400 g of behenic acid, 200 g of a mixture of octanoic acid and decanoic acid, 120 g of anhydrous oxalic acid and 180 g of pentaerythritol are introduced into a reactor and heated to 80–90° C. in order to obtain liquefaction.

The product, maintained with stirring, is heated at 198° C. for six hours. The product is then deodorized by being taken to 260° C. under 1 to 3 mm Hg for 3 hours. The flow of steam is introduced at the center of the reactor at a flow rate of 15 ml/100 g of mixture/hour, so as to ensure stirring.

A product is obtained which is cream-colored, solid and waxy at room temperature. The physical characteristics of the product are described in Example 1 of Table I.

EXAMPLES 2 TO 7

Six other coating compositions according to the invention are prepared as described above for Example 1.

The characteristics of the coatings of Examples 1 to 7, and also the characteristics of coatings of the prior art (comparative examples 1 to 4) are given in Table I below.

TABLE I

Characteristics of the coating compositions

| Examples | Low melting-point fatty acid fraction (B) | % (by wt.) | High melting-point fatty acid fraction (A) | % (by wt.) | Diacid | % (by wt.) | Polyol | % (by wt.) | Plasticizer | % (by wt.) | Fraction B/fraction A molar ratio | Alcohol function/acid function ratio |
|---|---|---|---|---|---|---|---|---|---|---|---|---|
| 1 | C8/C10 | 20.5 | Technical grade behenic acid | 49 | Oxalic acid | 12 | pentaerythritol | 18 | 0 | 0 | 0.9 | 1.0 |
| 2 | hydrogenated copra | 27 | Technical grade behenic acid | 41 | Malonic acid | 14 | pentaerythritol | 18 | 0 | 0 | 1.1 | 1.0 |
| 3 | hydrogenated copra | 32 | Technical grade behenic acid | 48 | 0 | 0 | pentaerythritol | 20 | 0 | 0 | 1.1 | 2.0 |
| 4 | C8/C10 | 23 | Technical grade behenic acid | 44 | Oxalic acid | 14 | pentaerythritol | 20 | 0 | 0 | 1.1 | 1.0 |
| 5 | hydrogenated copra | 37 | Technical grade behenic acid | 41 | Adipic acid | 4 | pentaerythritol | 18 | 0 | 0 | 1.5 | 1.5 |
| 6 | hydrogenated copra | 36 | Technical grade behenic acid | 46 | Adipic acid | 4 | pentaerythritol | 15 | Lotryl 35BA40 | 10 | 1.3 | 1.2 |
| 7 | C8/C10 | 37 | Technical grade behenic acid | 47 | 0 | 0 | dipentaerythritol | 16 | 0 | 0 | 1.7 | 1.0 |

TABLE I-continued

Characteristics of the coating compositions

| Examples | Melting temperature ° C. | Crystallization temperature | Penetration test |
|---|---|---|---|
| 1 | 42 | 41 | 59 |
| 2 | 39 | 41 | 10 |
| 3 | 55 | 53 | |
| 4 | 40 | 42 | 21 |
| 5 | 38 | 41 | 84 |
| 6 | 42 | 38 | 80 |
| 7 | 49 | 40 | |
| Comparative example 1 acetoglycerides[1] | 40 | 34 | 54 |
| Comparative example 2 acetoglycerides[2] | 53 | 46 | 90 |
| Comparative example 3 acetoglycerides + colophony esters | | | 36 |
| Comparative example 4 wax[3] | 48 | 45 | 99 |

[1]mixture of acetic esters of monoglycerides, diglycerides and triglycerides supplemented with placticizer
[2]acetic esters of monoglycerides of hydrogenated plant oil
[3]mixture of microcrystalline waxes and paraffins The characteristics given in the table were determined according to the following methods.
Measurement of melting and crystallization temperatures by differential thermal analysis with a 2° C. $min^{-1}$ temperature increase cycle
Penetration test or measurement of the maximum strength as a function of the displacement of the probe
Number of acid functions per gram of product or acidity: determination by potassium hydroxide-neutralization of the product dispersed in an organic solvent.

EXAMPLES 8 TO 15

The compositions of examples 1 to 7 described above were applied onto uncooked pressed cheeses of small format, of approximately 20 g, by soaking using one or two successive soakings in accordance with the following protocol:
Cheeses tempered at 13° C.–15° C. for approximately 2 h
Temperature of the $1^{st}$ bath 50–80° C.
Soaking time 0.5–2 sec
Crystallization time: 10–15 seconds
$2^{nd}$ bath if necessary; after crystallization, immersion of cheeses in a bath of water at approximately 2° C. for 10 minutes; the weight deposited ranges between 3.8 and 4.2.

The cheeses covered with their coating are scored according to a scale ranging from 0 to 6: 0 representing poor and 6 representing very good.
For the scoring, the following criteria were taken into account:
appearance: the appearance sought being smooth and dry;
feel: the desirable feel being unblemished and not greasy;
tearing off with the tear-strip: the effect sought being a clean and tidy cut without flaking of the coating;
extraction of the cheese: the effect sought being easy extraction without the cheese adhering to the shell of coating;
resistance to breaking: it is desirable to obtain a lack of cracks and splits on the shell of coating when pressure from a finger is applied.
The results are given in Table II below.
These results show that the coatings according to the invention have an appearance which is superior in quality to the wax-replacement products of the comparative examples (drier appearance, non-greasy feel). Moreover, their properties for use are stable over a wider temperature range than the comparative products, corresponding to the temperature ranges of the situations in which the coated products may find themselves given the distribution circuits for these products.

TABLE II

| | Results | | | | | | | | | | |
|---|---|---|---|---|---|---|---|---|---|---|---|
| Criteria | 1 | 2 | 3 | 4 | 5 | 6 | 7 | Comparative example 1 aceto-glycerides | Comparative example 2 aceto-glycerides | Comparative example 3 aceto-glycerides + colophony esters | Comparative example 4 wax |
| A- Temperature of the coating bath (° C.) | 72 | 60 | 65 | 65 | 65 | 72 | 60 | 60 | 58 | | 74 |
| B- Coating weight (g) | 3.7–4.0 | 4.9 | 5.2 | 4.7 | 3.8 | 3.8 | 4.7 | 3.9 | 3.7–4.0 | | 3.7–4.0 |
| C- Evaluation of the coated | | | | | | | | | | | |

TABLE II-continued

|  |  |  |  |  |  |  |  | Comparative example 1 aceto-glycerides | Comparative example 2 aceto-glycerides | Comparative example 3 aceto-glycerides + colophony esters | Comparative example 4 wax |
|---|---|---|---|---|---|---|---|---|---|---|---|
| Criteria | 1 | 2 | 3 | 4 | 5 | 6 | 7 |  |  |  |  |
| cheeses: C-1 before opening |  |  |  |  |  |  |  |  |  |  |  |
| Appearance | 6 | 6 | 6 | 6 | 6 | 6 | 6 | 6 | 6 | 6 | 6 |
| Feel | Dry | greasy sticky | dry | Greasy | Dry | dry | dry | slightly greasy | slightly greasy | very greasy | dry |
| C-2 upon opening at 4° C. |  |  |  |  |  |  |  |  |  |  |  |
| Tearing off of the tear-strip |  | 6 | 2 | 6 | 4 | 6 | 3 | 6 | 5 | 3 | 6 |
| Extraction of the cheese |  | 5 | 5 | 6 | 6 | 6 | 4 | 6 | 6 | 2 | 6 |
| Resistance to breaking |  | 5 | 0 | 4 | 2 | 5 | 2 | 5 | 3 | 0 | 5 |
| C-3 upon opening at 20° C. |  |  |  |  |  |  |  |  |  |  |  |
| Tearing off of the tear-strip | 5 | 4 | 4 | 6 | 5 | 6 |  | 6 | 6 |  |  |
| Extraction of the cheese | 5 | 4 | 4 | 5 | 6 | 6 |  | 5 | 4 |  | 5 |
| Resistance to breaking | 5 | 5 | 3 | 5 | 4 | 6 |  | 6 | 6 |  | 5 |
| C-4 upon opening at 35° C. |  |  |  |  |  |  |  |  |  |  |  |
| Tearing off of the tear-strip |  | too soft |  | 6 | 6 | 6 |  | too soft |  |  | 5 |
| Extraction of the cheese |  |  |  | 6 | 6 | 4 |  | 4 |  |  | 5 |
| Resistance to breaking |  |  |  | 6 | 6 | 2 |  | 6 |  |  | 6 |

The invention claimed is:

1. A process for coating cheeses, wherein a coating composition is applied onto whole cheeses or portions of cheese, wherein said coating composition comprises from 60% to 100% by weight of a product of esterification of at least one fatty acid and at least one polyol containing a branched chain having at least 5 carbon atoms and at least 2 OH groups, and wherein the polyol containing a branched chain corresponds to the general formula:

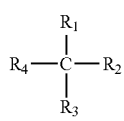

I in which $R_1$, $R_2$, $R_3$ and $R_4$, which may be identical or different, are selected from a $C_1$–$C_6$ alkyl group or a $C_1$–$C_6$ hydroxyalkyl group; or in which $R_4$ represents a group

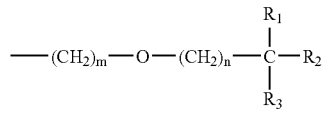

with m and n, which are identical or different, being an integer from 1 to 6, and $R_1$, $R_2$ and $R_3$ being as defined above, provided that at least two from $R_1$ to R3 are a $C_1$–$C_6$ hydroxyalkyl group.

2. The process as claimed in claim 1, wherein the polyol containing a branched chain comprises a neopentyl group.

3. The process as claimed in claim 1, wherein the polyol is selected from the group consisting of pentaerythritol, neopentyl glycol, trimethylolethane, trimethylolpropane and dipentaerythritol.

4. The process as claimed in claim 1, wherein the fatty acids consist of at least one fatty acid of a group (A) and at least one fatty acid of a group (B), the group (A) having a melting range at least 40° C. higher than that of the group (B).

5. The process as claimed in claim 4, wherein the fatty acids of group (A) are saturated or unsaturated fatty acids having more than 12 carbon atoms.

6. The process as claimed in claim 5, wherein the fatty acids of group (A) are selected from hydrogenated palm and rapeseed fatty acids.

7. The process as claimed in claim 4, wherein the fatty acids of group (B) are saturated or unsaturated fatty acids having from 1 to 12 carbon atoms.

8. The process as claimed in claim 7, wherein the fatty acids of group (B) are selected from the group consisting of hydrogenated copra fatty acids, octanoic acid, decanoic acid and mixtures thereof.

9. The process as claimed in claim 8, wherein the fatty acids of group (A) are present at 50 to 100% by weight relative to the total weight of the fatty acids, and the fatty acids of group (B) are present in an amount up to 50% by weight relative to the total weight of the fatty acids.

10. The process as claimed in claim 4, wherein the B/A molar ratio is between 0.8 and 1.5.

11. The process as claimed in claim 1, wherein the coating comprises at least one polycarboxylic acid esterified with the polyol via one or two of its carboxylic functions.

12. The process as claimed in claim 11, wherein the polycarboxylic acid is selected from the group consisting of sebacic acid, adipic acid, succinic acid, malic acid and oxalic acid, in an amount up to 20% by weight, relative to the total weight of the coating.

13. The process as claimed in claim 11, wherein the coating composition comprises up to 20% by weight of polycarboxylic acid relative to the total weight of the coating composition.

14. The process as claimed in claim 1, wherein the coating composition contains a plasticizer compatible with foodstuffs.

15. The process according to claim 14, wherein said plasticizer is a copolymer of ethylene and butyl acrylate or butyl methacrylate, or a copolymer vinyl acetate and of ethylene acetate.

16. A coated cheese, comprising a coating, obtained according to the process of claim 1.

* * * * *